(12) United States Patent
Hamill et al.

(10) Patent No.: US 11,812,728 B2
(45) Date of Patent: Nov. 14, 2023

(54) PET FETCHING DEVICE

(71) Applicant: iFetch, LLC, Austin, TX (US)

(72) Inventors: Dennis W. Hamill, Austin, TX (US); Deborah Lynn Hamill, Austin, TX (US); Kit Morris, Austin, TX (US); John Vanderveen, Austin, TX (US); Smith Newnam, Austin, TX (US); Chris Owens, Austin, TX (US)

(73) Assignee: iFetch, LLC, Austin, TX (US)

(*) Notice: Subject to any disclaimer, the term of this patent is extended or adjusted under 35 U.S.C. 154(b) by 582 days.

(21) Appl. No.: 16/131,343

(22) Filed: Sep. 14, 2018

(65) Prior Publication Data

US 2019/0008120 A1    Jan. 10, 2019

Related U.S. Application Data

(63) Continuation of application No. PCT/US2017/022810, filed on Mar. 16, 2017, which
(Continued)

(51) Int. Cl.
*A01K 15/02* (2006.01)
*A63B 69/40* (2006.01)
*A63B 69/00* (2006.01)

(52) U.S. Cl.
CPC .......... *A01K 15/025* (2013.01); *A01K 15/027* (2013.01); *A63B 69/0053* (2013.01);
(Continued)

(58) Field of Classification Search
USPC ....... 119/707, 702, 709, 710, 711, 51.91–69; D30/160; 446/168; 473/432, 433;
(Continued)

(56) References Cited

U.S. PATENT DOCUMENTS

| 87,410 A | * | 3/1869 | Hauschild | |
| 1,037,877 A | * | 9/1912 | Doerr | A63F 9/02 273/397 |

(Continued)

FOREIGN PATENT DOCUMENTS

| CN | 202759985 U | 3/2013 |
| CN | 105075892 A | 11/2015 |
| WO | WO199600600 | 1/1996 |

OTHER PUBLICATIONS

International Search Report issued in PCT/US2017/022810 dated Aug. 6, 2017, 2 pgs.
(Continued)

*Primary Examiner* — Andrea M Valenti
(74) *Attorney, Agent, or Firm* — Polsinelli PC

(57) ABSTRACT

Implementations described and claimed herein provide systems and methods for interactive fetching for one or more participants, such as pets. In one implementation, a projectile, such as a ball, is received in a receiver and transported through an opening into a feeder of a randomizer. One of a plurality of chutes is randomly selected using gravity, and the projectile is transported from the feeder into the selected chute. The chute generates a smooth roll along a ramp to a port, from which the projectile is ejected along an ejection path for the participant to retrieve.

17 Claims, 18 Drawing Sheets

Related U.S. Application Data is a continuation-in-part of application No. 29/550,740, filed on Jan. 6, 2016, now Pat. No. Des. 804,110.

(60) Provisional application No. 62/309,094, filed on Mar. 16, 2016.

(52) U.S. Cl.
CPC .......... *A63B 69/40* (2013.01); *A63B 2208/14* (2013.01); *A63B 2209/00* (2013.01)

(58) Field of Classification Search
USPC ..... 273/118 R, 112, 120 R, 401, 394, 138.3, 273/138.4; 124/6, 16
See application file for complete search history.

(56) References Cited

U.S. PATENT DOCUMENTS

| | | | | |
|---|---|---|---|---|
| 1,528,661 | A * | 3/1925 | Ewing | A63F 7/305 273/394 |
| 1,687,775 | A * | 10/1928 | Lestage | A63F 7/305 273/138.4 |
| 2,936,179 | A * | 5/1960 | Thurston | A63B 63/00 473/194 |
| 3,350,097 | A * | 10/1967 | Chevrette | A63B 63/08 273/350 |
| 3,599,978 | A * | 8/1971 | Sondergaard | A63B 69/40 273/342 |
| 3,844,267 | A | 10/1974 | Mohr | |
| 4,039,193 | A * | 8/1977 | Slater | A63F 5/0094 273/138.4 |
| 4,076,251 | A * | 2/1978 | Hornsby, Jr. | A63F 7/3622 273/120 R |
| 4,260,155 | A * | 4/1981 | Jordan | A63F 7/3622 273/120 R |
| 4,865,318 | A | 9/1989 | Lehmann | |
| 5,029,867 | A * | 7/1991 | Johnson | A63B 24/0021 473/192 |
| 5,370,391 | A | 12/1994 | Hilzendeger | |
| 5,409,211 | A | 4/1995 | Adamek | |
| 5,573,252 | A * | 11/1996 | Simmons | A63B 63/08 273/396 |
| 5,632,490 | A * | 5/1997 | Brown | A63F 7/048 273/138.3 |
| D391,332 | S | 2/1998 | Williams | |
| 5,749,797 | A | 5/1998 | Sunseri | |
| 6,142,890 | A * | 11/2000 | Craig | A63B 63/08 273/394 |
| 6,176,230 | B1 | 1/2001 | Thompson | |
| 6,315,672 | B1 * | 11/2001 | Gillot | A63G 31/00 434/247 |
| D456,866 | S | 5/2002 | Turpault | |
| 6,505,576 | B2 | 1/2003 | Nathanson | |
| 6,817,351 | B2 | 11/2004 | Keller | |
| D641,437 | S | 7/2011 | Nugent | |
| D719,706 | S | 12/2014 | Hamill | |
| 9,345,946 | B2 | 5/2016 | Hamill | |
| D793,498 | S * | 8/2017 | Manus | D21/701 |
| D797,385 | S * | 9/2017 | Hamill | D30/160 |
| D802,856 | S * | 11/2017 | Hamill | D30/160 |
| 2004/0020481 | A1 * | 2/2004 | Keller | F41B 3/04 124/6 |
| 2006/0048712 | A1 * | 3/2006 | Boyer | A01K 5/0225 119/57.91 |
| 2006/0213453 | A1 | 9/2006 | Conrady | |
| 2009/0217918 | A1 | 9/2009 | Mckenzie | |
| 2013/0036987 | A1 * | 2/2013 | Taylor | A01K 15/025 119/707 |
| 2013/0228138 | A1 | 9/2013 | Hamill | |
| 2016/0096095 | A1 * | 4/2016 | Williams | F41B 3/04 124/5 |

OTHER PUBLICATIONS

Written Opinion issued in PCT/US2017/022810 dated Aug. 6, 2017, 7 pgs.
International Preliminary Report on Patentability issued in PCT/US2017/022810 dated Sep. 18, 2018, 8 pgs.
Examiner's Requisition issued in CA 3,017,977, dated Jul. 16, 2019.
Supplementary European Search Report issued in EP 17767573, dated Sep. 23, 2019, 2 pgs.
European Search Opinion issued in EP 17767573, dated Sep. 23, 2019, 5 pgs.
Examination Report No. 1 issued in AU 2017232933, dated Feb. 12, 2019, 6 pgs.
First Office Action issued in CN 2017800244045, dated Oct. 19, 2020, 27 pgs.

* cited by examiner

PET FETCHING DEVICE

CROSS-REFERENCE TO RELATED APPLICATIONS

The present application is a continuation of International Patent Corporation Treaty Patent Application No. PCT/US2017/022810, filed Mar. 16, 2017 and entitled "PET FETCHING DEVICE", which is a continuation-in-part of U.S. Design patent application No. 29/550,740, filed Jan. 6, 2016, now U.S. Design Pat. No. D804,110, issued Nov. 28, 2017, entitled "PET FETCHING DEVICE". The present application further claims priority under 35 U.S.C. § 119(e) to U.S. Provisional Patent Application No. 62/309,094, entitled "MULTI-OUTPUT PET FETCHING DEVICE" and filed on Mar. 16, 2016. Each of these applications is specifically incorporated by reference in its entirety herein.

TECHNICAL FIELD

Aspects of the present disclosure relate to pet fetching systems and methods and more particularly to an interactive gravity-driven fetching device that randomly ejects a projectile from one of a plurality of ports.

BACKGROUND

Pets need exercise to ensure they are physically and mentally healthy. The amount of exercise needed depends on the species, breed, age, and health of the pet. However, most pets generally need exercise daily. Pets may receive the exercise they need through various activities, including walking, running, and playing. Many of these activities require human involvement and interaction to occur. For example, "fetch" is a popular activity for exercising a dog, which involves a human throwing a ball for the dog to retrieve and/or catch and return to the human. However, a human is often not available sufficiently to participate in activities to ensure that a pet receives the exercise and/or entertainment it needs.

Some devices launch projectiles for a pet to catch and/or retrieve. However, many of these devices are not interactive, leaving a human to load the device with projectiles or otherwise participate in the activity. Further, such devices are typically operated using a power source, such as batteries or power supplied via an outlet, which may become depleted or otherwise unavailable during the activity. Other devices eliminate the moving parts for launching, such that a power source is not needed. However, many of these devices simply dribble the projectile out of the device, failing to attract and hold the attention of the pet.

It is with these observations in mind, among others, that various aspects of the present disclosure were conceived and developed.

SUMMARY

Implementations described and claimed herein address the foregoing issues by providing an interactive fetching device with a randomized output. Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve an interactive fetching device the randomly ejects a projectile, such as a ball, through one of a plurality of ports. In one aspect, a pet drops a projectile into a receiver of the interactive fetching device. The interactive fetching device transports the ball to a feeder connected to a plurality of chutes. The chutes may be positioned equidistant from each other, such that the projectile randomly falls under the force of gravity into one of the plurality of chutes. The projectile is then ejected through a port corresponding to the chute. As such, the pet drops the projectile into the receiver, and the interactive fetching device provides a randomized output through one of a plurality of ports, such that the pet cannot predict the ejection path of the projectile.

The randomized output provides both physical and mental stimulation for the pet. Because the pet cannot predict the ejection path of the projectile, the pet will actively fetch the ball instead of standing at the exit path and waiting for the ball to reach the pet. Furthermore, the interactive fetching device may be gravity driven, eliminating any electrical or motor components, thereby allowing the pet to use the interactive fetching device for an unlimited duration and without human involvement.

The presently disclosed technology generally provides for interactive fetching with a randomized output. While the implementations described herein reference interactive games for a pet using a ball, it will be appreciated that the presently disclosed technology is applicable to various participants, including human children, and a variety of projectile types.

Figure 1:
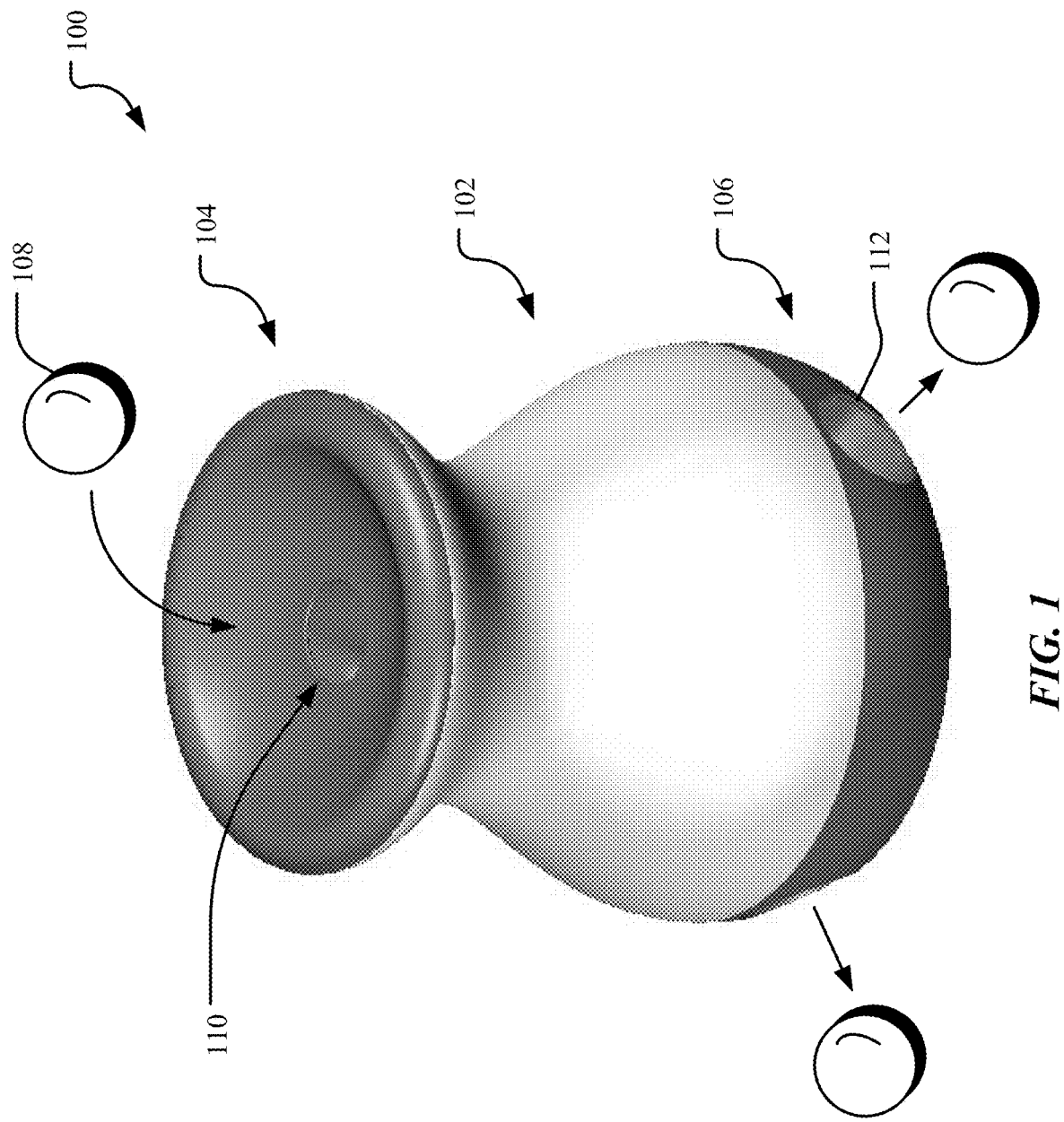
FIG. 1 is illustrates an example pet fetching device with a randomized output.

To begin a detailed description of an example interactive fetching device 100, reference is made to FIG. 1. In one implementation, the interactive fetching device 100 includes a shell 102, a receiver 104, and a base 106.

The receiver 104, the shell 102, and the base 106 may be oriented in a vertical arrangement, such that the receiver 104 is disposed at a proximal end of the interactive fetching device 100, and the base 106 is disposed at a distal end of the interactive fetching device 100, with the shell 102 extending therebetween. In one implementation, the receiver 104 includes an opening 110 adapted to receive a projectile 108 from a participant, such as a pet, and the base 106 includes a plurality of ports 112 providing a randomized output of the projectile 108 for the participant to retrieve. The projectile 108 may be, without limitation, a ball, toy, or other item adapted for interactive fetching.

Figure 2:
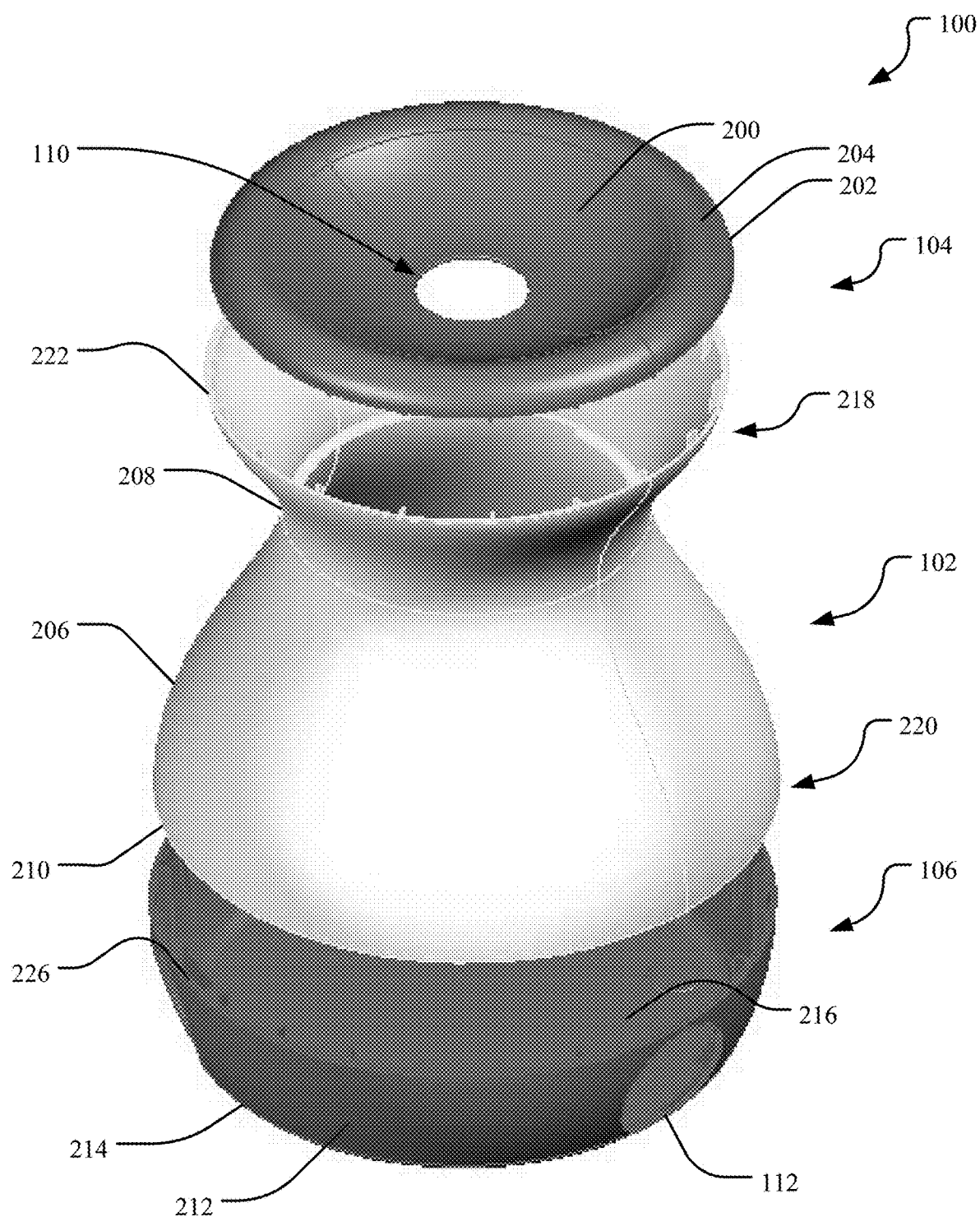
FIG. 2 is an exploded view of the pet fetching device.

Referring to FIGS. 1 and 2, in one implementation, the receiver 104, the shell 102, and the base 106 form a housing enclosing interior components of the interactive fetching device 100. The housing may be made from a variety of materials, including, but not limited to, plastic, metal, wood, ceramics, rubber, glass, and/or the like. For example, the housing may be made from a thermoplastic polymer, such as polycarbonate.

In one implementation, the receiver 104 includes a receiver surface 200 extending to a receiver edge 202. The receiver surface 200 is shaped to receive and direct the projectile 108 to the opening 110. In one implementation, the receiver surface 200 extends distally along a concave contour to the opening 110. Once the projectile 108 is received from the participant in the receiver 104, the receiver surface 200 transports the projectile 108 to the opening 110 and through the opening 110 into an interior of the interactive fetching device 100 using gravity. The receiver 104 may include a lip 204 having a surface that extends proximally from the receiver surface 200 to the receiver edge 202 along a curve.

The receiver 104 connects to a top portion 218 of the shell 102. In one implementation, the shell 102 includes a shell surface 206 extending between the top portion 218 and a bottom portion 220. The top portion 218 includes a top edge 222, and the bottom portion 220 includes a bottom edge 210. In one implementation, a neck 208 is disposed between the top portion 218 and the bottom portion 220.

The shell 102 may have a variety of shapes. For example, the shell surface 206 may extend distally from the top portion 218 along a set of contours, increasing and decreasing a diameter of the shell 102. In one implementation, the shell surface 206 extends distally along a first contour from the top edge 222 to the neck 208. The first contour extends inwardly toward a center of the shell 102, such that the shell 102 decreases in diameter from the top edge 222 to the neck 208. From the neck 208, the shell surface 206 extends distally along a second contour to the bottom edge 210. The second contour extends outwardly away from the center of the shell 102, such that the shell 102 increases in diameter from the neck 208 to the bottom edge 210.

In one implementation, the top portion 218 has an opening defined by the top edge 222, with the top edge 222 having a diameter mirroring a diameter of the receiver edge 202. Similarly, the bottom portion 220 has an opening defined the bottom edge 210, with the bottom edge 210 having a diameter mirroring a diameter of a top base edge 226 of the base 106.

The base 106 has a base surface 212 extending distally from the top base edge 226 to a bottom base edge 214 of a support surface 216. The base 106 may have a variety of shapes. For example, the base surface 212 may extend along a contour, decreasing a diameter of the base 106 from the top base edge 226 to the bottom base edge 214. The support surface 216 extends between the base surface 212 and is substantially flat to provide a stable surface for placement of the interactive fetching device 100 on an indoor or outdoor surface for use.

The bottom portion 218 of the shell 102 and the base 106 may have a wider diameter than the top portion 216 and the receiver 104, resulting in a larger proportion of a weight of the interactive fetching device 100 being biased towards the bottom. This creates stability, reducing accidental displacement or overturning of the interactive fetching device 100, which may render the interactive fetching device 100 inoperable. Furthermore, the support surface 216 of the base 106 may include supports or protections, such as rounded rubber protects, to further increase stability and protect the surface where the interactive fetching device 100 is placed. As such, the interactive fetching device 100 can be confidently used without human involvement.

In one implementation, the shell 102 may be coupled to the receiver 104 and the base 106 using one or more fasteners which maintain the shell 104. The housing, including the shell 102, receiving portion 104, and base 106, can also be secured using other components including, but not limited to clips, screws, gels, glues, nuts and bolts, snaps, etc. The shape of the housing formed by the shell 102, receiving portion 104, and base 106 may vary. For example, the overall shape of the housing may be, without limitation, hourglass, rounded, rectangular, conical, triangular, elliptical, hexagonal, hemispherical, hemiellipsoidal, cubical, pyramidal, and/or cylindrical and may include one or more contours, angles, and/or the like.

The housing may further include one or more features to assist in training the pet to use the interactive fetching device 100. For example, the housing may include a ledge, platform, drawer, or other compartment to hold treats for use in rewarding the pet during training. Such features may be fixed or removable and may be disposed inside or outside of the housing.

Figures 3A, 3B:
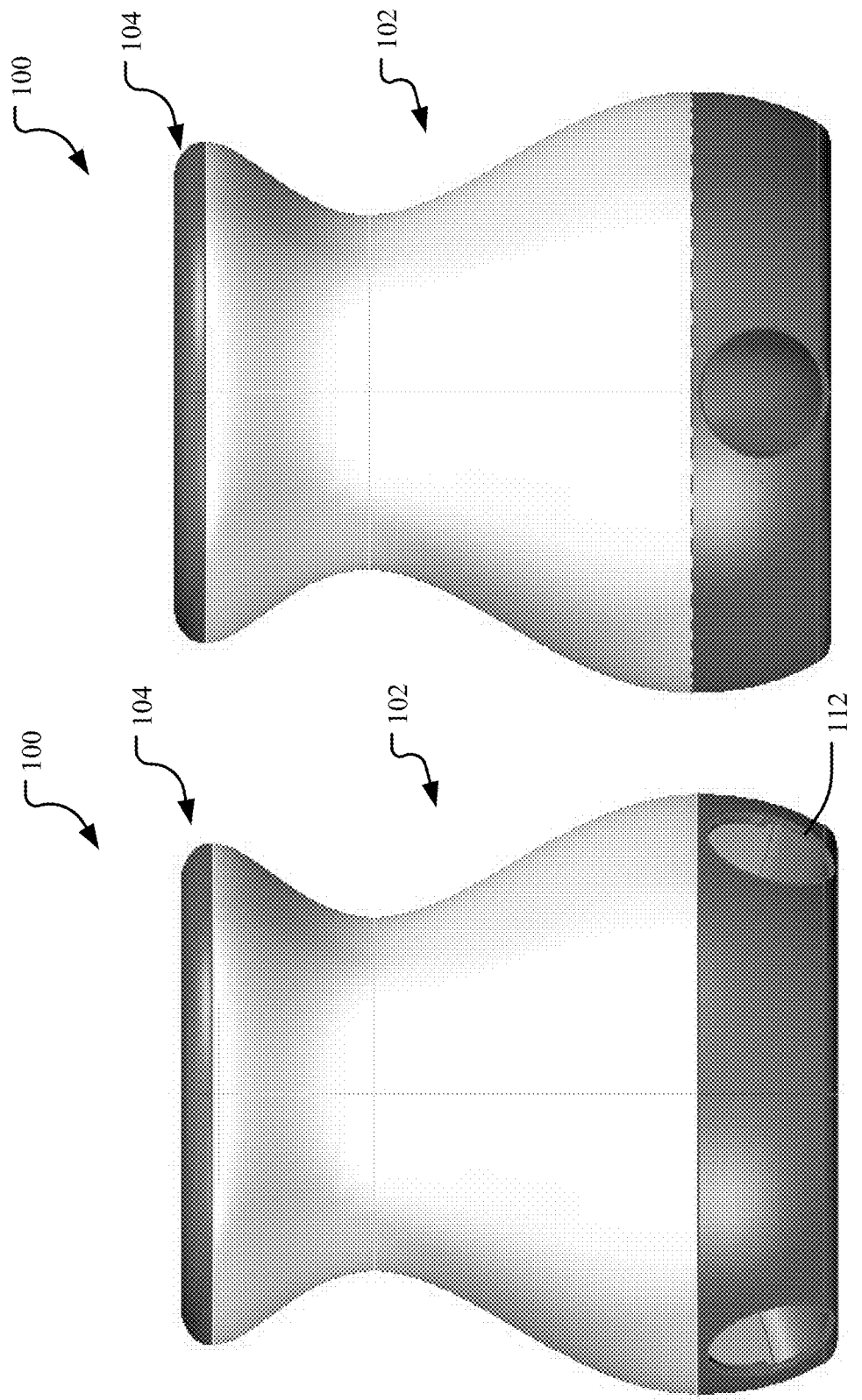
FIGS. 3A-B are a first side view and a second side view, respectively, of the pet fetching device

Referring to FIGS. 3A-3B, in one implementation, the base 106 includes the plurality of ports 112, such as three ports, defined in the base surface 212. The ports 112 may be disposed around the base 106 equidistant from each other to randomize the exit of the projectile 108 and provide a range of different ejection paths for the projectile 108 to travel. It should be appreciated that the plurality of ports 112 may be a variety of shapes such as circular, rectangular, square, triangular, or any shape to accommodate the projectile 108. There may also be more or less than three ports and the plurality of ports 112 can be positioned on other parts of the housing, such as the shell 102, and with other spacing relative to each other.

Figure 4:
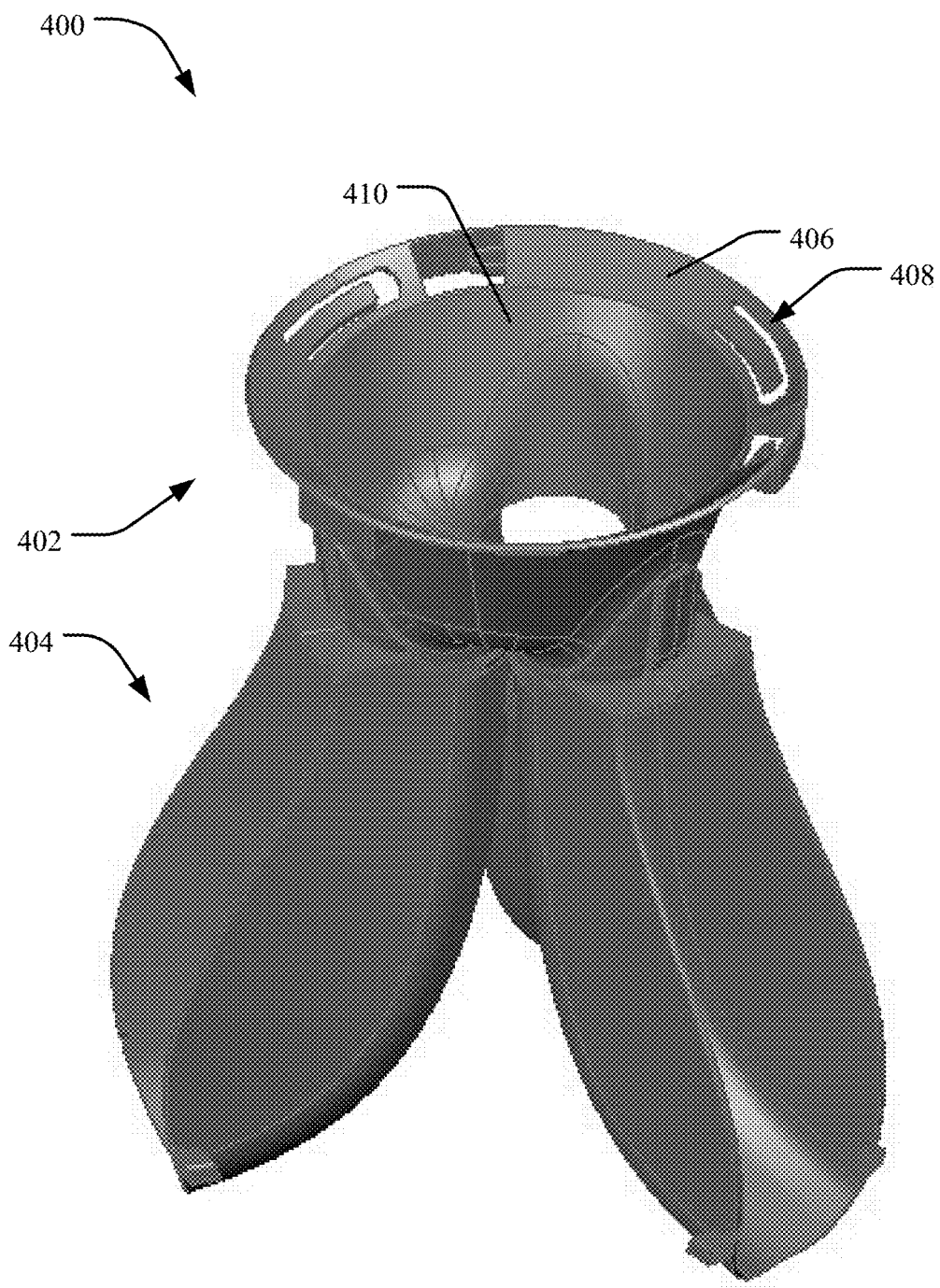
FIG. 4 is an isometric view of an example projectile randomizer of the pet fetching device.
Figure 5:
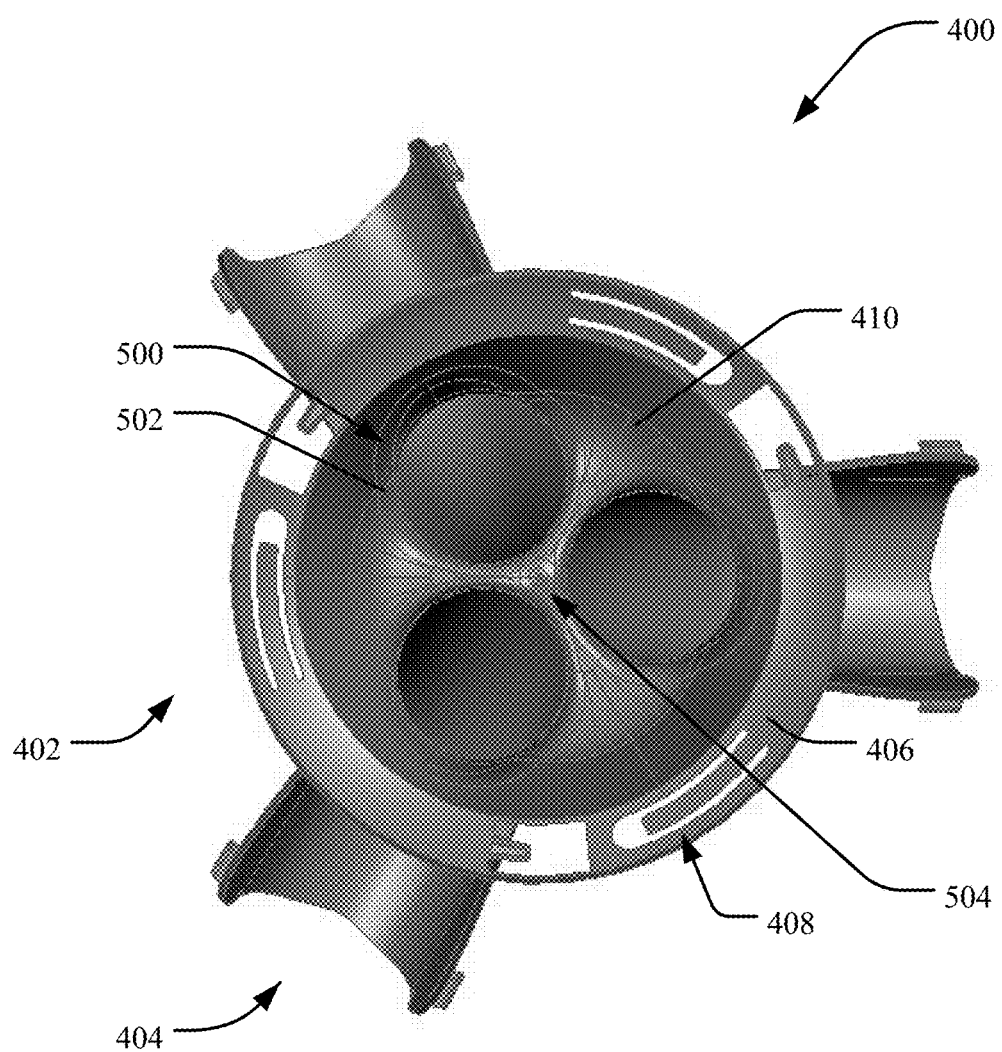
FIG. 5 is a detailed top view of the projectile randomizer.

For a detailed discussion of interior components of the interactive fetching device 100, reference is made to FIGS. 4-12. Turning first to FIGS. 4-5, in one implementation, the interior components including a projectile randomizer 400 having a feeder 402 and a plurality of chutes 404. The feeder 402 may include a lip 406, a plurality of attachment clips 408, and a feeder surface 410.

In one implementation, the plurality of attachment clips 408 are located on the lip 406 and are configured to engage corresponding features on the receiver 104, thereby attaching the feeder 402 to the receiver 104 and positioning the feeder 402 relative to the opening 110. Although the feeder 402 is shown as a separate component that is connected to the receiver 104 with the attachment clips 408, it will be appreciated that the feeder 402 can be integrated into the receiver 104.

The feeder surface 410 may extend from the lip 406 distally along a contour to a plurality of chute inputs 500. In one implementation, each chute in the plurality of chute inputs 500 has an input curved edge 502, which aids in smoothly transporting the projectile 108 from the feeder 402 to the plurality of chutes 404 using gravity. The plurality of chute inputs 500 may be positioned equidistance from each other in the feeder 402 so that the projectile 108 has an equal chance of travelling through any one of the plurality of chute inputs 500. In one implementation, a common area between the plurality of chute inputs 500 defines a junction portion 504 on the feeder surface 410, which is disposed below a center of the opening 110.

Figure 6:
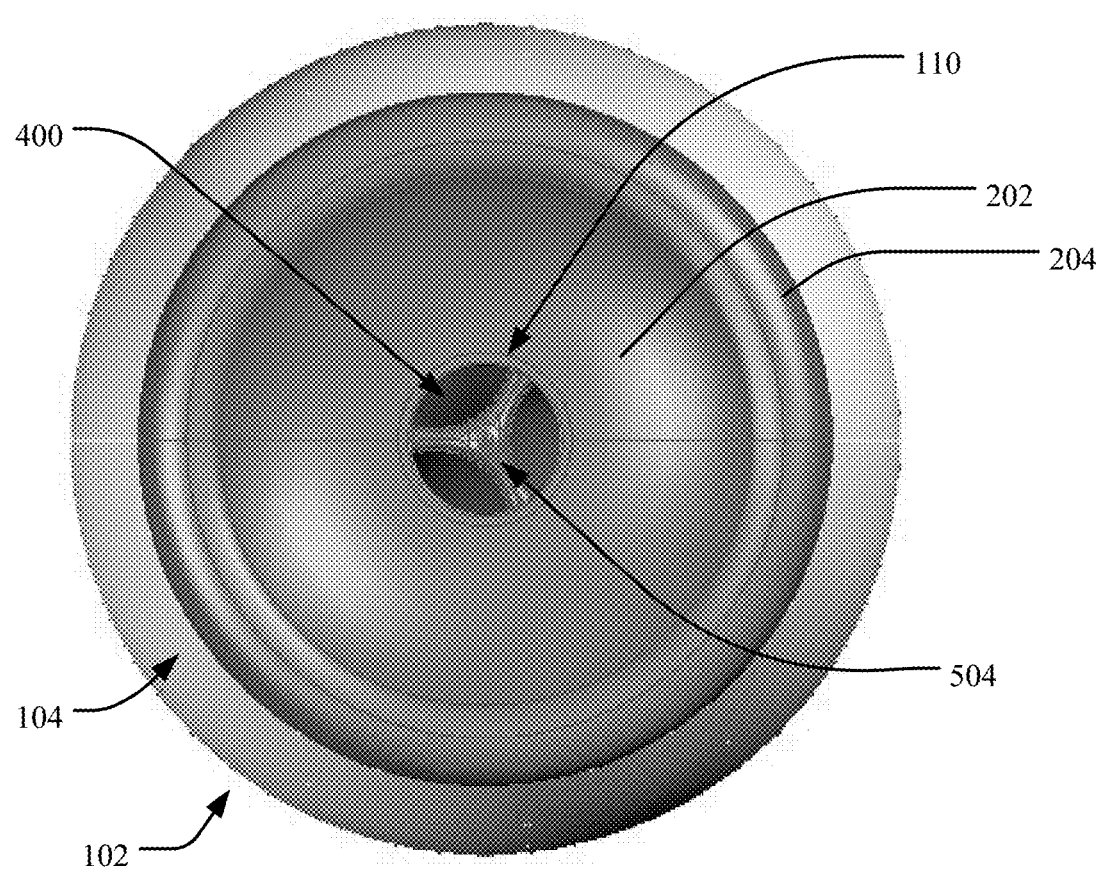
FIG. 6 is a top view of the pet fetching device

As can be understood from FIG. 6, in one implementation, the receiver 104 directs the projectile 108 to the center of the receiver 104 where the projectile 108 will drop through the opening 110. The feeder 400 received the projectile 108 in the junction portion 504 where the projectile 108 has an equal chance of falling into any one of the plurality of input chutes 500. The input curved edges 502 aid the projectile 108 in smoothly falling into one of the plurality of chute inputs 500. The smooth roll generated by the input curved edges 502 optimizes the exit speed of the projectile 108.

Figure 7:
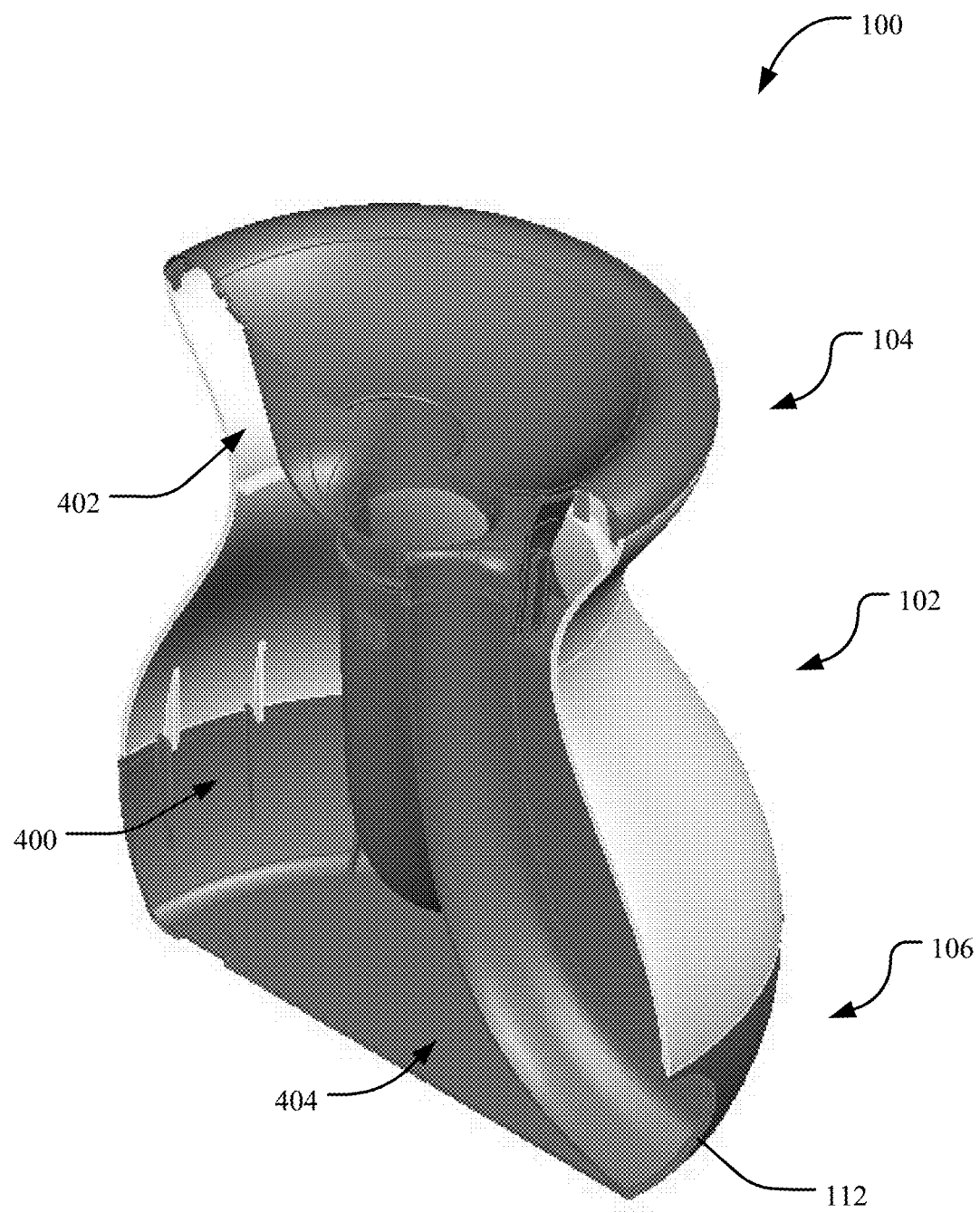
FIG. 7 is a sectional view of the pet fetching device.

FIG. 7 illustrates a sectional view of the interactive fetching device 100 and illustrates an example ejection path the projectile 108 may take. As previously discussed, the projectile 108 is received in the receiver 104 where the projectile 108 is directed to the randomizer 400. When the projectile 108 is received in the randomizer 400, the projectile 108 enters the feeder 402 where the projectile 108 randomly falls through one of the input chutes 500 into the corresponding chute 404 and exits through the corresponding port 112.

In one implementation, a shape of each of the chutes 404 transitions quickly into a slightly off vertical orientation, which maintains the projectile 108 in contact with a ramp of the chute 404 to initiate a smooth roll without bouncing or jostling. A near vertical angle of a top portion of the chute 404 increases a speed of the projectile 108 as it is transported along the ramp using gravity, while steadily increasing the roll of the projectile 108. The shape of the chutes 404 thus provides a smooth exit without skidding and with increased distance along an ejection path. The chute 404 may further be angled relative to the support surface 216 and port 112 to smoothly transition the projectile from the interactive fetching device 100 along the ejection path for retrieval. The smooth transition increases distance and exit speed. The transition of the vertical orientation of the chute 404 at the top near the feeder 402 to the angled orientation the port 112 may be gradual, with the transition primarily occurring in a bottom portion of the chute 404, thereby increasing roll speed of the projectile 108 while in the portion of the chute 404 that is vertically oriented.

Figure 8:
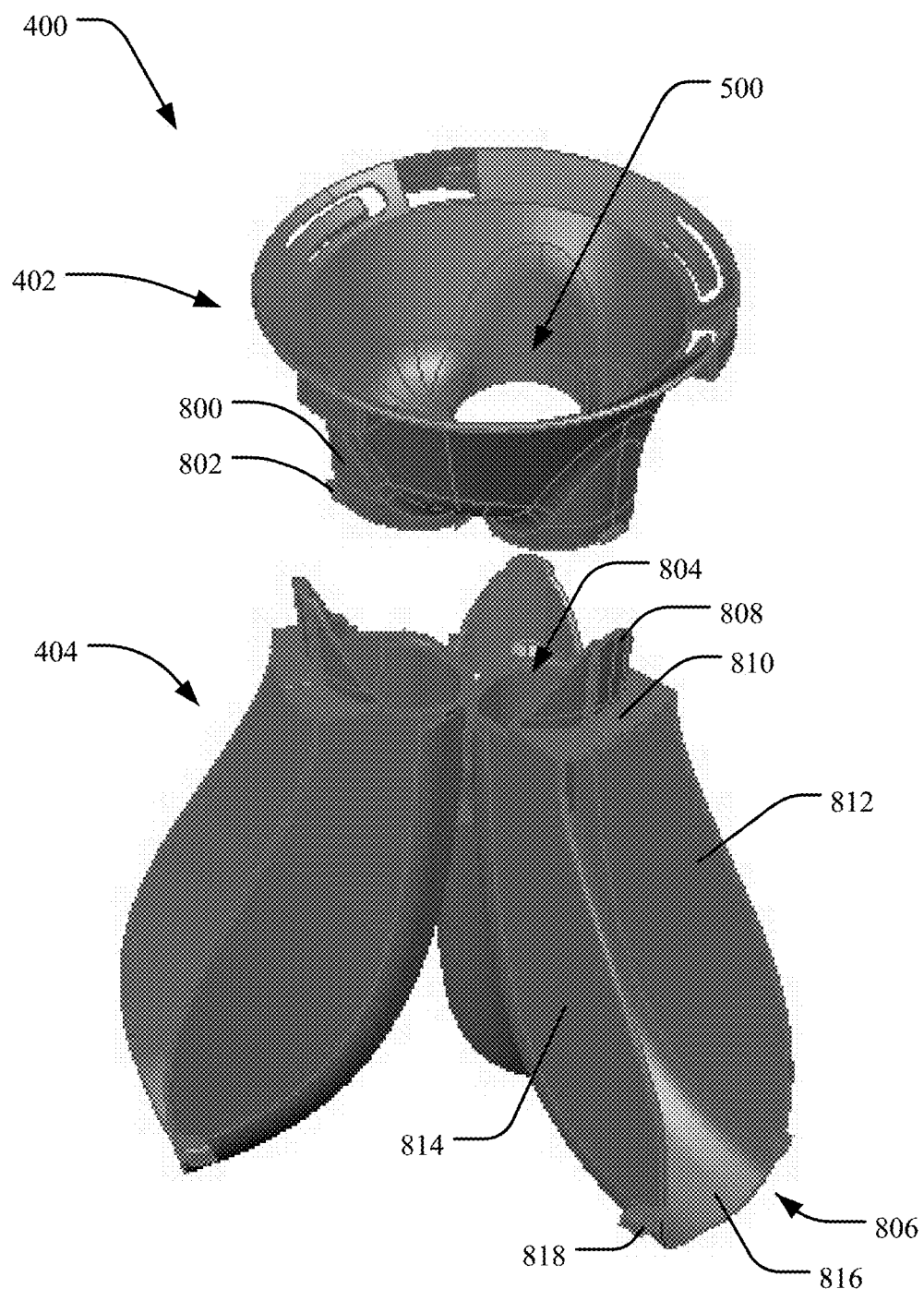
FIG. 8 is an exploded view of the projectile randomizer.

FIG. 8 is an exploded view of the projectile randomizer 400. In one implementation, each input chute in the plurality of input chutes 500 has a corresponding receiver 800 and receiver clip 802. Each chute in the plurality of chutes 404 has a corresponding intake end 804, a chute petal 808, and a petal support 810. The chute petal 808 is connected to the intake end 804 and couples the plurality of chutes 404 to their respective chute inputs 500 of the feeder 402. The chute petal 808 slides over the receiver 800 and connects to the receiver clip 802, so that the chute petal 808 and the chute opening 804 are flush against the receiver 800 and the input chute 500, respectively. The chute petal support 810 is connected to the intake end 804 and provides support to the chute petal 808.

FIG. 8 also details the plurality of chutes 404, including a ramp 816 with a first guard 812 and a second guard 814 connected to opposite sides of the ramp 816. The first guard 812 and the second guard 814 prevent the projectile 108 from rolling off of the side of the ramp 816. The ramp 816 transports the projectile 108 from the intake end 804 to an exit end 806 where the projectile 108 exits the device 100 through the port 112. The chute 404 is attached to the base 106 and the port 112 via a plurality of chute attachments 818. However, it will be appreciated that although the plurality of chutes 404 are shown as separate components, the plurality of chutes 404 may be integrated into the feeder 402 or the base 106 as one piece or coupled to the feeder 402 or the base 106 by other means. The plurality of chutes 404 may be made from a thermoplastic polymer, such as polycarbonate. However, other materials, including but not limited to metal, wood, ceramics, rubber, glass, and other plastics are contemplated.

The plurality of chutes 404, including a shape of the ramp 816, affects the exit speed of the projectile 108. The exit speed of the projectile 108 is provides a fulfilling experience for the participant, such as a pet. If the projectile 108 exits the device 100 too slowly, then the pet can quickly and easily retrieve the projectile 108 near the interactive fetching device 100. The pet will not have to travel far to retrieve the projectile 108, which will result in little to no physical exercise. Furthermore, the pet will likely lose interest if fetching the projectile 108 is too easy. The exit speed of the projectile 108 is related to the angles in each portion of the ramp 816, as can be understood from FIG. 9. A smooth roll provides a high exit speed. Any jostling or bouncing of the projectile 108 will reduce the exit speed.

Figure 9:
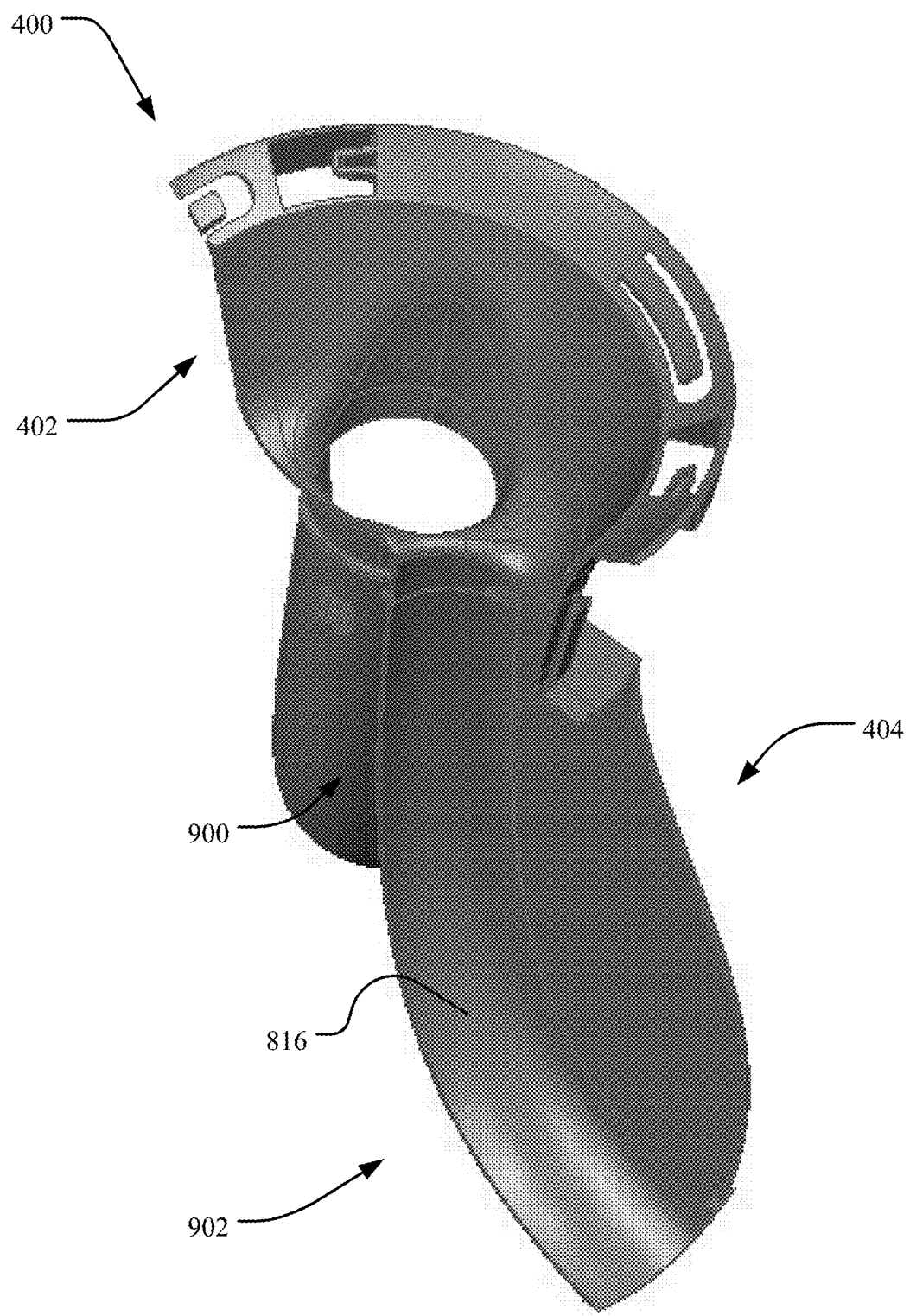
FIG. 9 is a sectional view of the projectile randomizer.

Turning to FIG. 9, the top two-thirds of the chute 404 defines a first section 900. The first section 900 has a near vertical angle so that the projectile 108 will gain as much speed as possible. The bottom third of the chute 404 defines a second section 902 where the projectile 108 transitions from travelling vertically to travelling horizontally. The curve of the second section 902 has a smooth and gradual rate of change until it reaches the port 112, such that the projectile 108 will remain in contact with the ramp 816 and roll without bouncing or jostling until the projectile 108 exits the device 100. By optimizing the curve of the ramp 816 to smoothly roll the projectile 108 down the ramp 816 without any perturbations, the projectile 108 will pick up as much speed in the first section 900 as possible, transition to exiting the interactive fetching device 100 smoothly, and result in a notably high exit speed. Additionally, the plurality of ports 112 may be positioned low in height on the base surface 212 to further allow a smooth transition from the interactive fetching device 100 to the ground surface by minimizing bounce when the projectile 108 contacts the ground surface.

Figure 10:
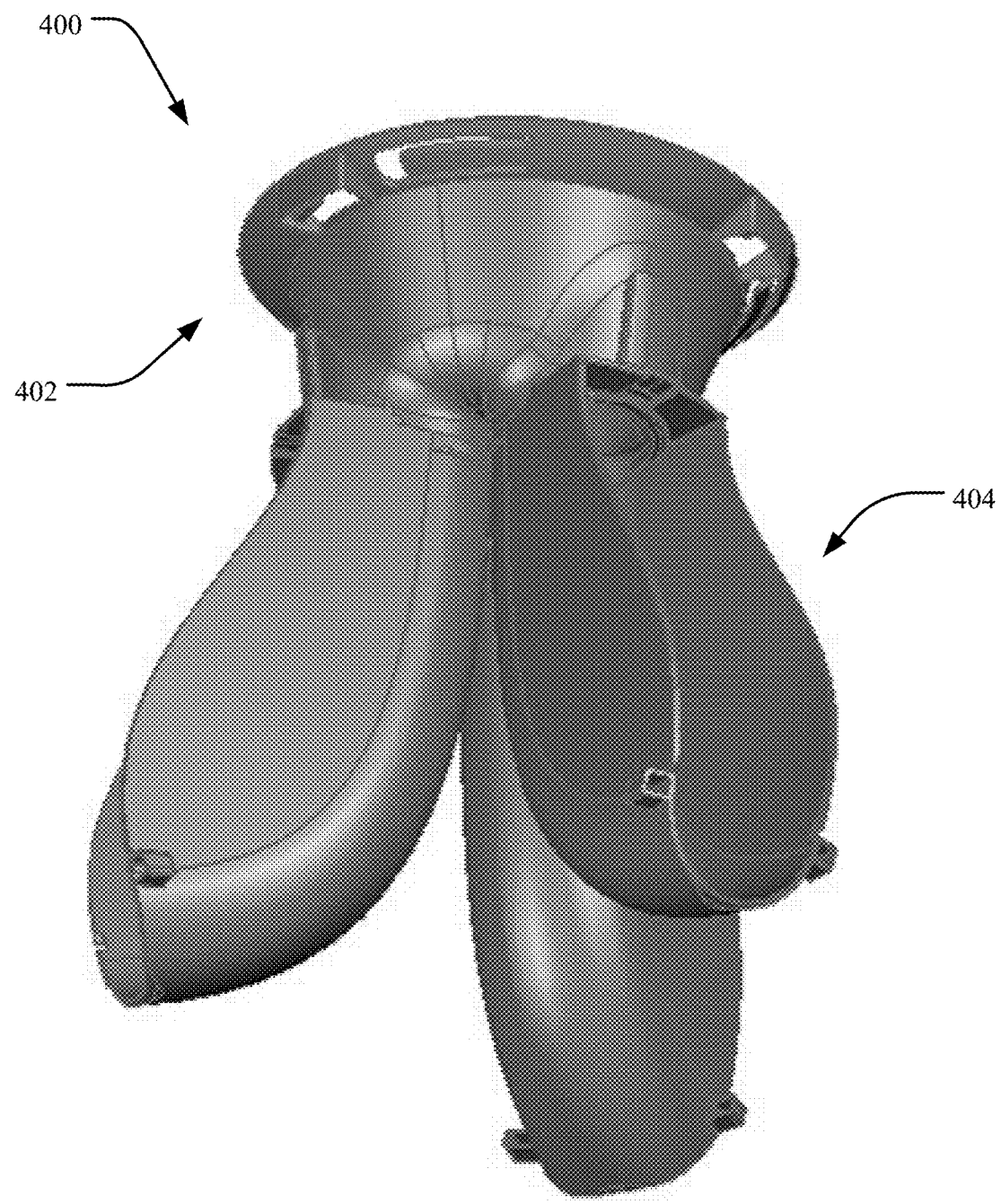
FIG. 10 is a bottom perspective view of the projectile randomizer.
Figure 11:
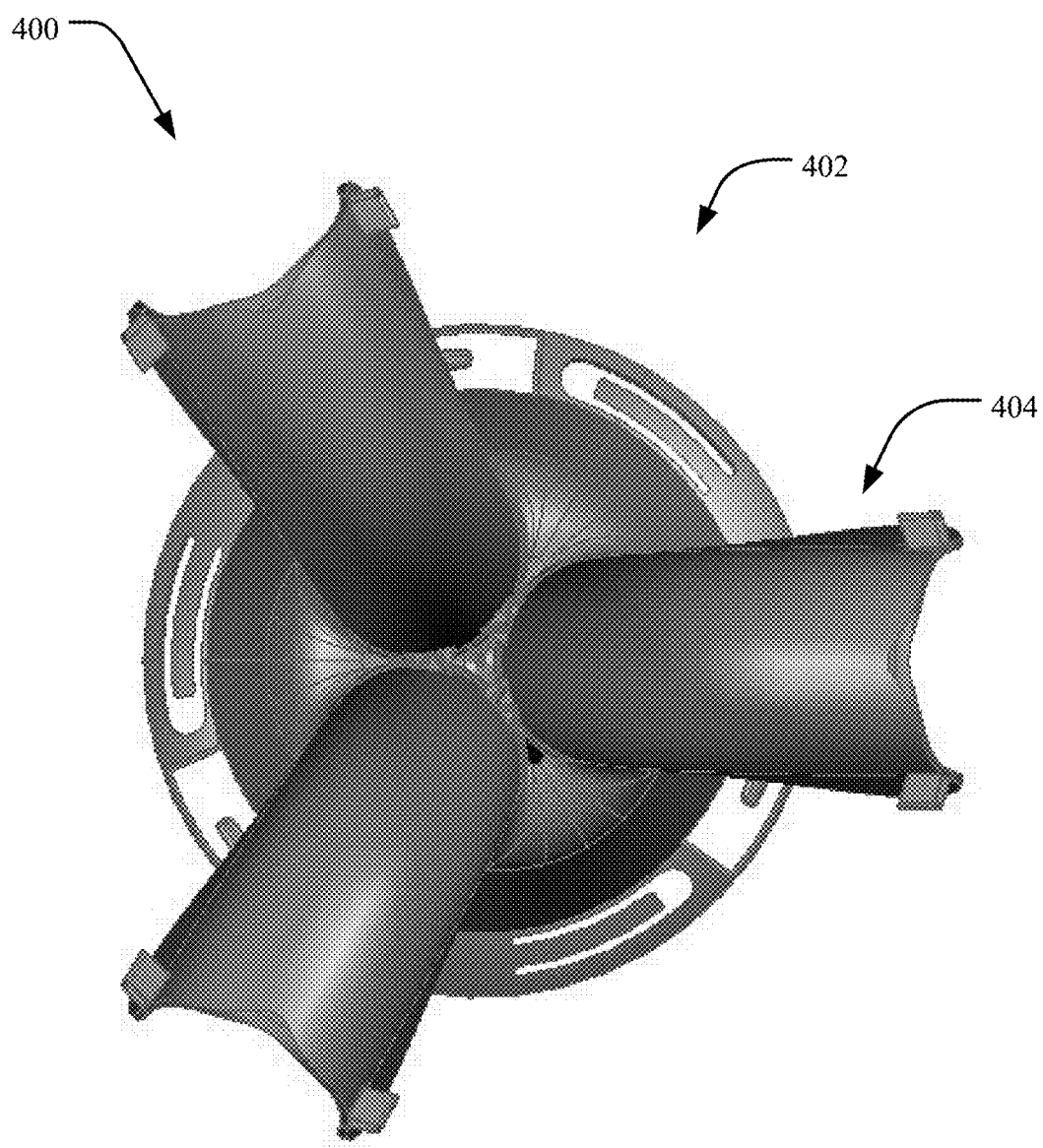
FIG. 11 is a bottom view of the projectile randomizer.
Figure 12B:
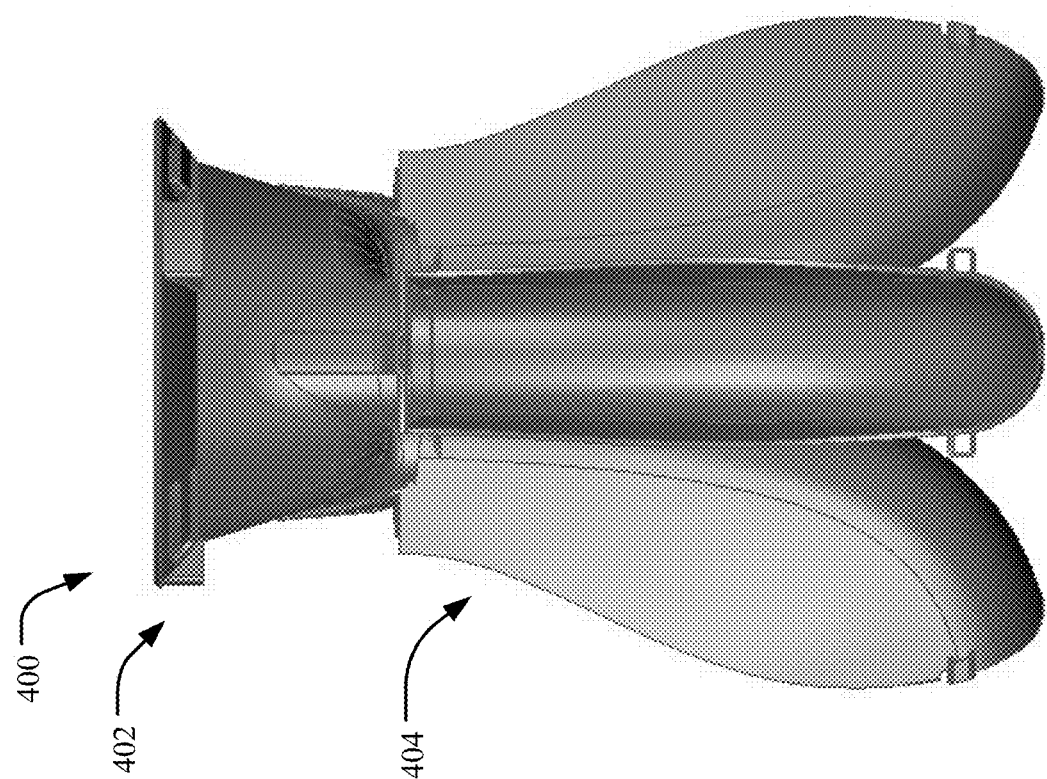
FIGS. 12A-D are a first side, a second side, a front, and a back view of the projectile randomizer, respectively.
Figure 12A:
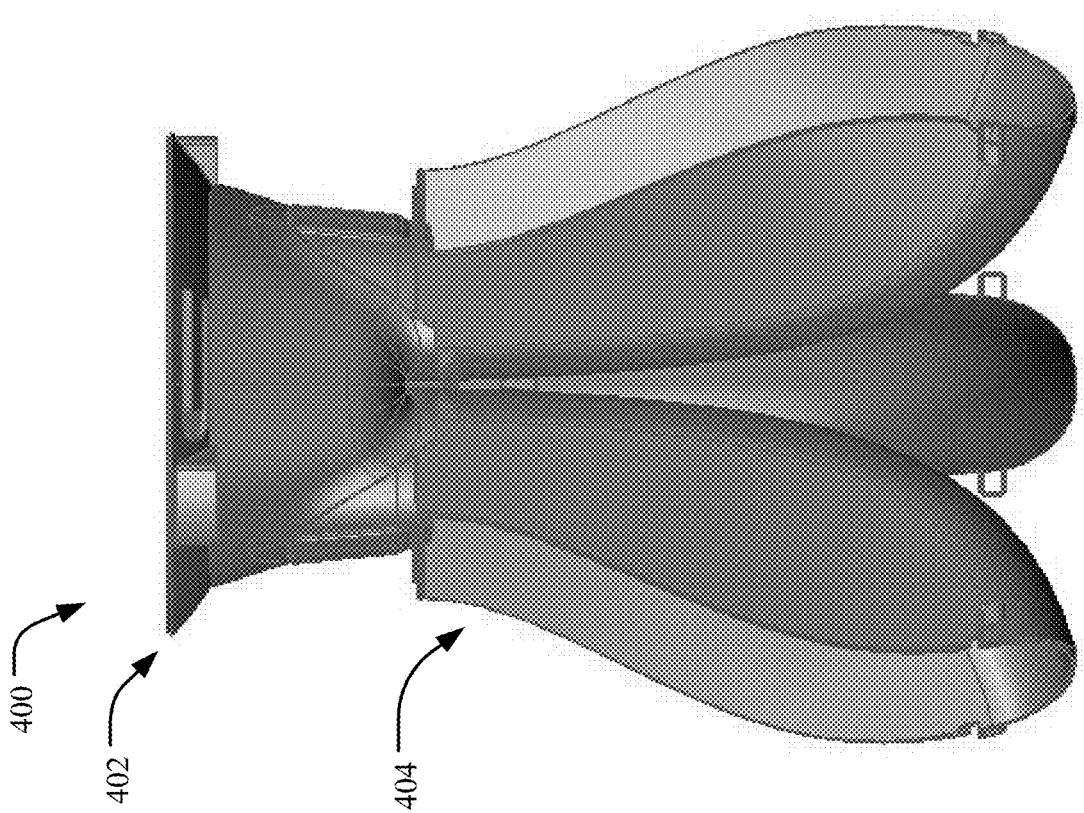
Figure 12D:
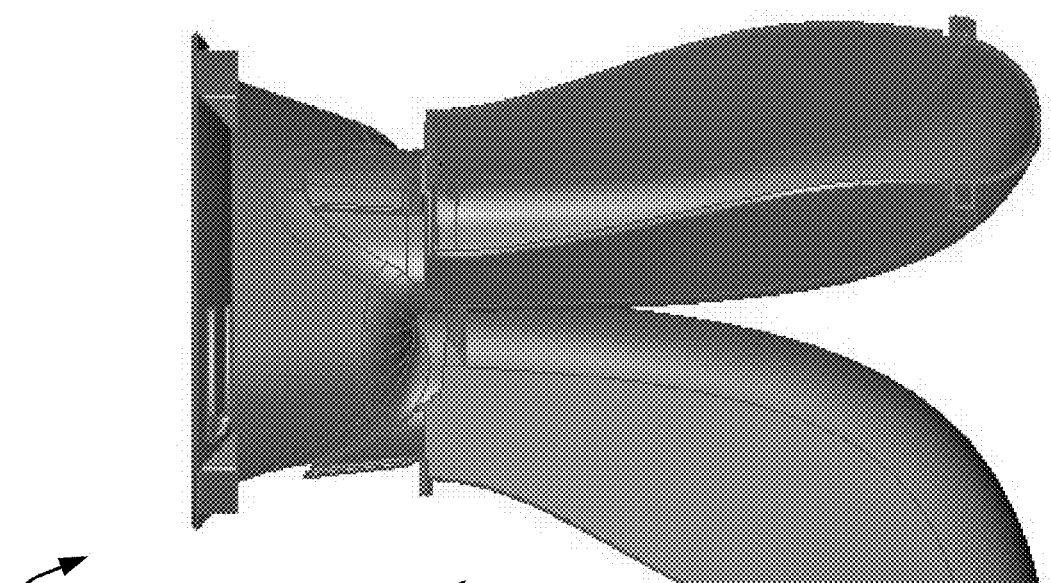
Figure 12C:
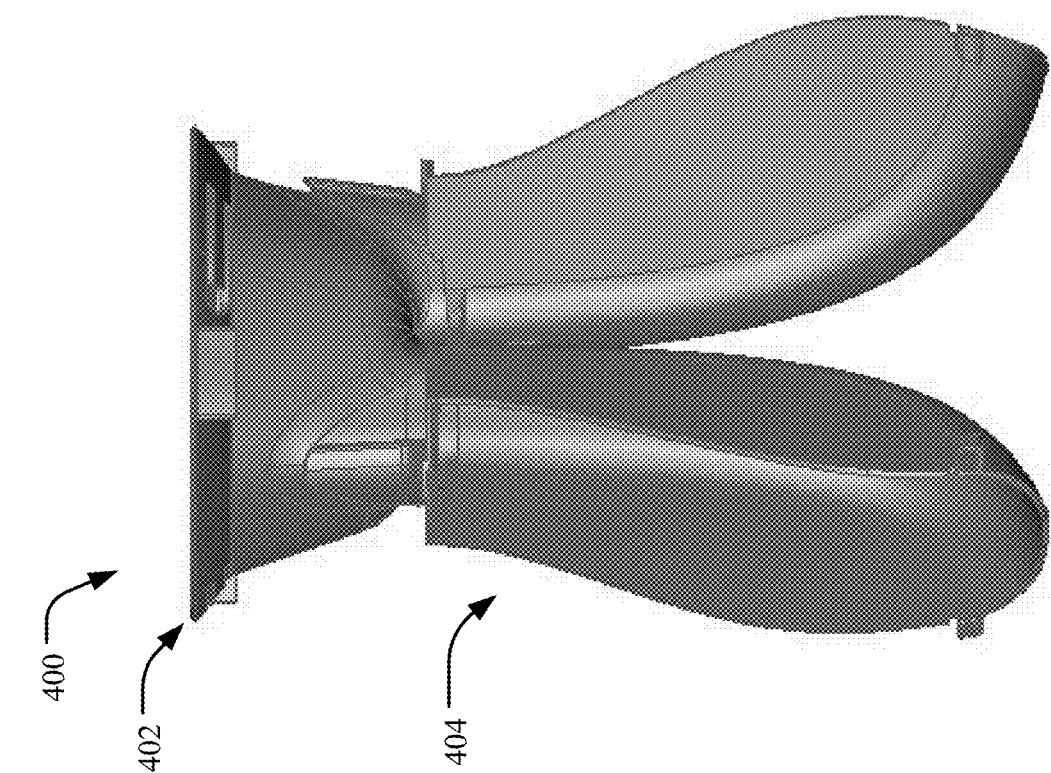

FIGS. 10-12 show an example positioning of the plurality of chutes 404 where three chutes 404 are positioned equidistance from each other. As previously discussed, three chutes 404 creates an unpredictable ejection path resulting in both physical and mental stimulation for the pet. Three chutes 404 also require less manufacturing and parts. However, it will be appreciated that there can be more or less than three chutes 404.

Figure 13:
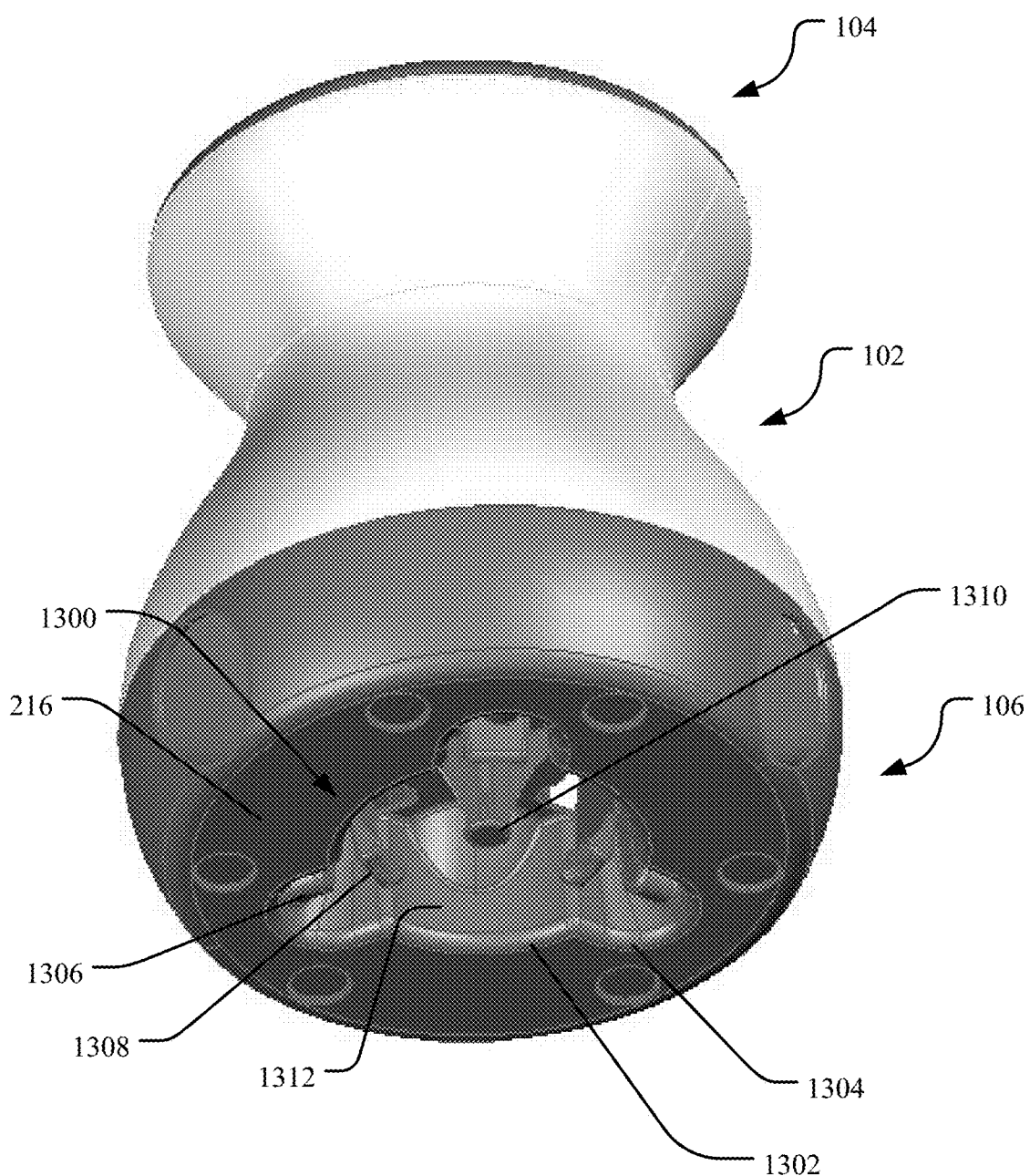
FIG. 13 is a bottom perspective view of the pet fetching device.
Figure 14:
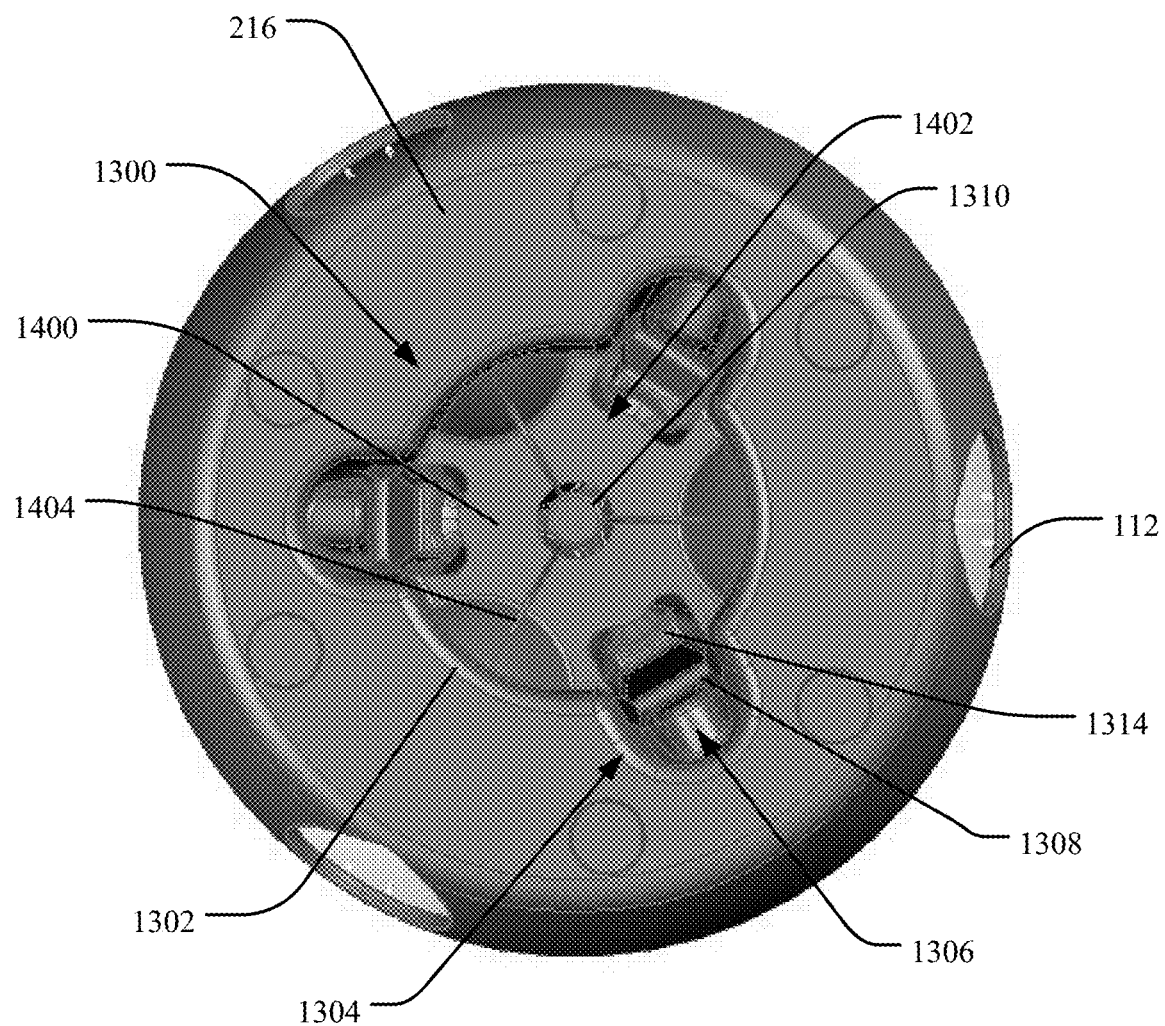
FIG. 14 is a bottom view of the base.
Figure 15:
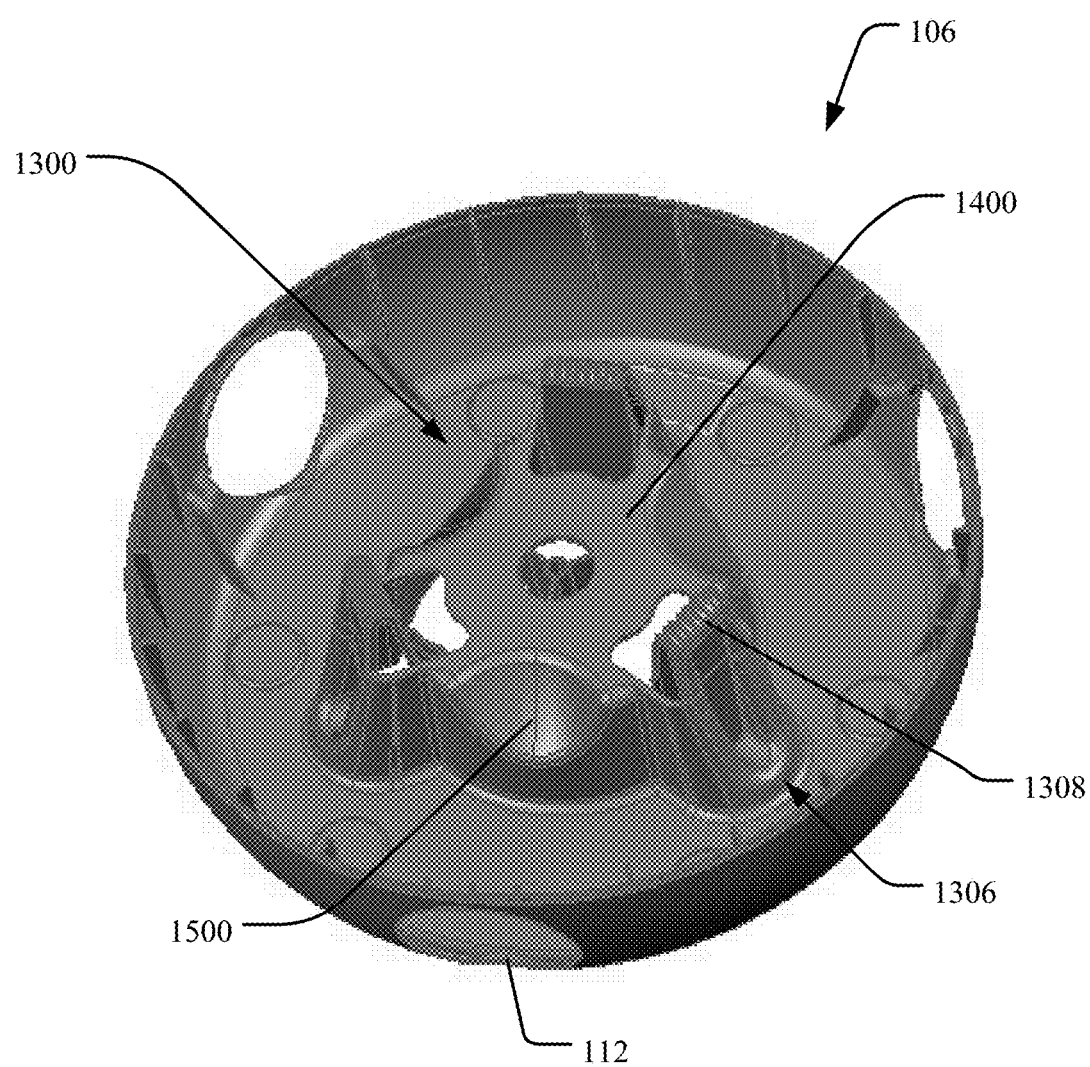
FIG. 15 is a top perspective view of base.

Turning to FIGS. 13-15, an optional holding system 1300 in the base 106 is shown. The holding system 1300 stores one or more of the projectiles 108 with the interactive fetching device 100. This prevents the projectiles 108 from getting lost and reduces storage space as the projectiles 108 do not need to be stored separately. As shown in FIGS.

13-14, features of the holding system 1300 can be integrated into the base 106. In one implementation, the holding system 1300 is located on the support surface 216 of the base 106. The holding system 1300 has an upper circumferential rim 1302, with three extending segments 1304, from which side walls connect to a holding base 1400. It will be appreciated that although the holding unit 1300 is located on the base 106 of the device 100, holding unit 1300 or simply a plurality holding clips 1308 may be located on the receiver 104, shell 102, interior housing of the device 100, and/or alternatively attached to an external component.

The extending segments 1304 can be semi-circular in shape, and indent inward toward a semi-circular base 1306. The semi-circular base 1306 follows the curvature of the extending segments 1304, providing space for the placement of an object (e.g., thumb) that may be used for exerting and/or releasing force to the holding clip 1308. The holding clip 1308 defines an upward extending segment with an upper and lower end. The lower end is mostly flat and attaches to the holding base 1400. The upper end extends upward to the approximate height of the upper circumferential rim 1302 of the holding system 1300, and includes a hook like segment 1314 for holding the projectile 108. While a hook like segment 1314 is illustrated on the upper end of holding clip 1308, fasteners, a cover, or other similar components may be used to hold the projectile 108 in place. The area between the holding clip 1404 and a junction segment 1310 defines a holding area 1402 where the projectile 108 can fit and be held in place. The holding clip 1308 may be bias toward the holding area 1402 and result in the holding area 1402 being larger in diameter at the holding base 1400 than at its upper circumference. The junction segment 1310 can be an upward extending post-like segment used to provide support and help maintain the projectile 108 positioned in the holding area 1402. The junction segment 1310 may also have a plurality of dividers 1404 to separate a corresponding plurality of projectiles 108 from each other.

In one implementation, a projectile 108 that is currently held by the holding clip 1308 may be removed by placing a thumb in the extending segment 1304, while a fore finger is placed on the holding clip 1308 in order to pinch the holding clip 1308 back so that the projectile 108 may be removed. Alternatively, the holding clip 1308 may be retracted to provide space for the placement and securement of a projectile 108 in the holding area 1402. In another example, the forward biased holding clip 1308 pushes back against an extending sidewall of extending segment 1304 as the projectile 108 is pushed into position in the holding area 1402. As the projectile 108 is fitted into the holding area 1402, the holding clip 1308 retracts back to the biased forward position, which can help in securing the projectile 108.

Figure 16:
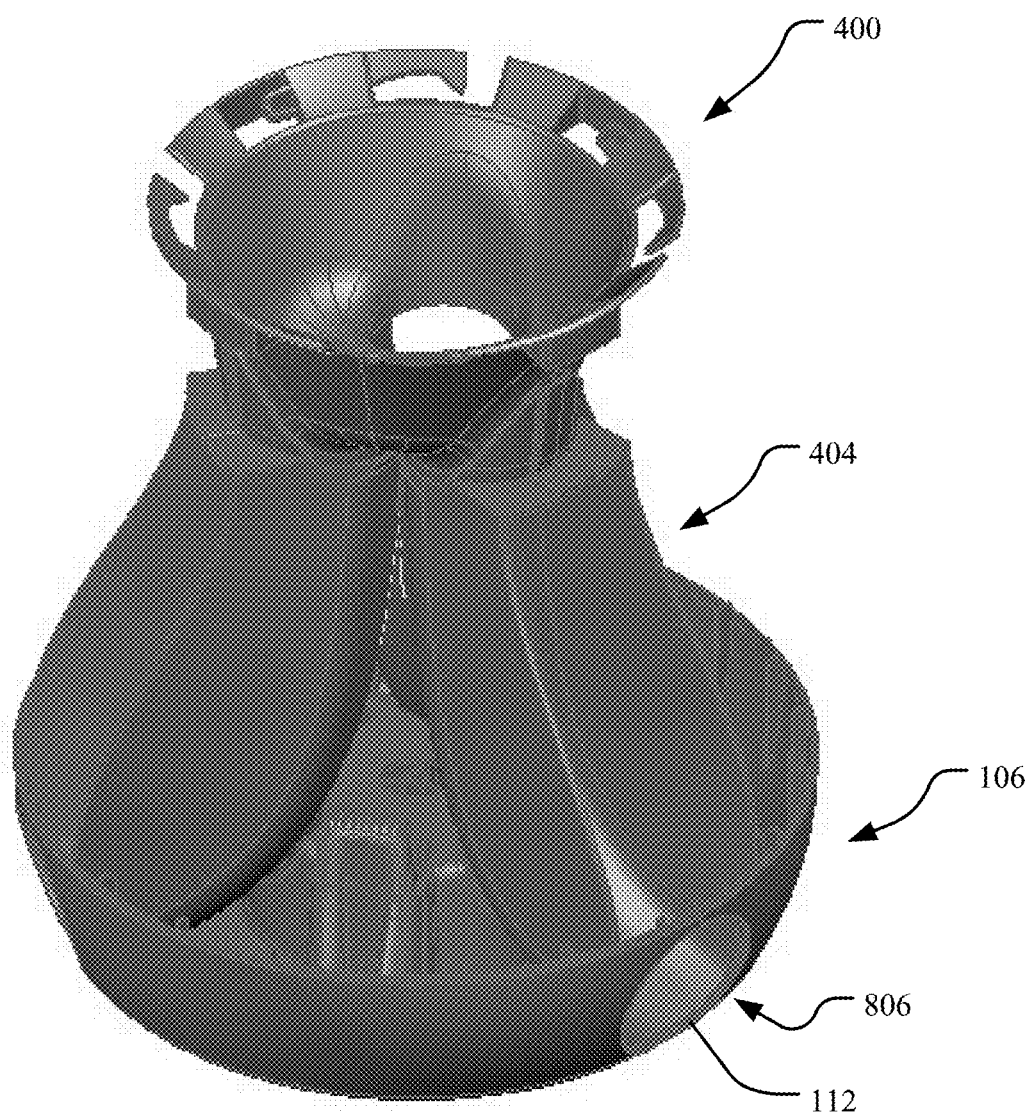
FIG. 16 is an isometric view of the projectile randomizer extending from the base.

Turning to FIGS. 15 and 16, an interior view of the holding unit 1300 is provided. In one implementation, the holding unit 1300 extends upward into the interior of the base 106 as shown in FIG. 15. The inward area represents the ball holding area 1402, which is visible in the exterior view (shown in FIG. 14). The interior view also shows the attachment of the lower end of the holding clip 1308 with the semi-circular base 1306. The semi-circular base 1306 extends upward to connect to the holding clips 1308 and forms a triangular prism like connection. The top of the triangular prism connection forms corrugated indentations, where the two sections meet.

The holding system 1300 also has a plurality of chute indentations 1500 on the interior portion so that the plurality of chutes 404 can be supported on the corresponding chute indentations 1500. In one implementation, the holding clips 1308 can be spaced such that each holding clip 1308 lies between two ports 112. For example, the holding area 1402, an exterior component shown in FIG. 14, can include a chute indentation 1500 on the interior portion, shown in FIG. 15, designed to support a chute 404. Thus, the spacing between the two holding clips 1308 is designed so that the projectile 108 is held in the exterior of device 100, while the plurality of chutes 404 can be positioned to fit in the area in the interior of the holding unit 1300, as shown in FIG. 16. Furthermore, across from the plurality of chute indentations 1500 are the corresponding plurality of ports 112 for coupling the exit end 806 of the chute 404 to the port 112.

Figure 17:
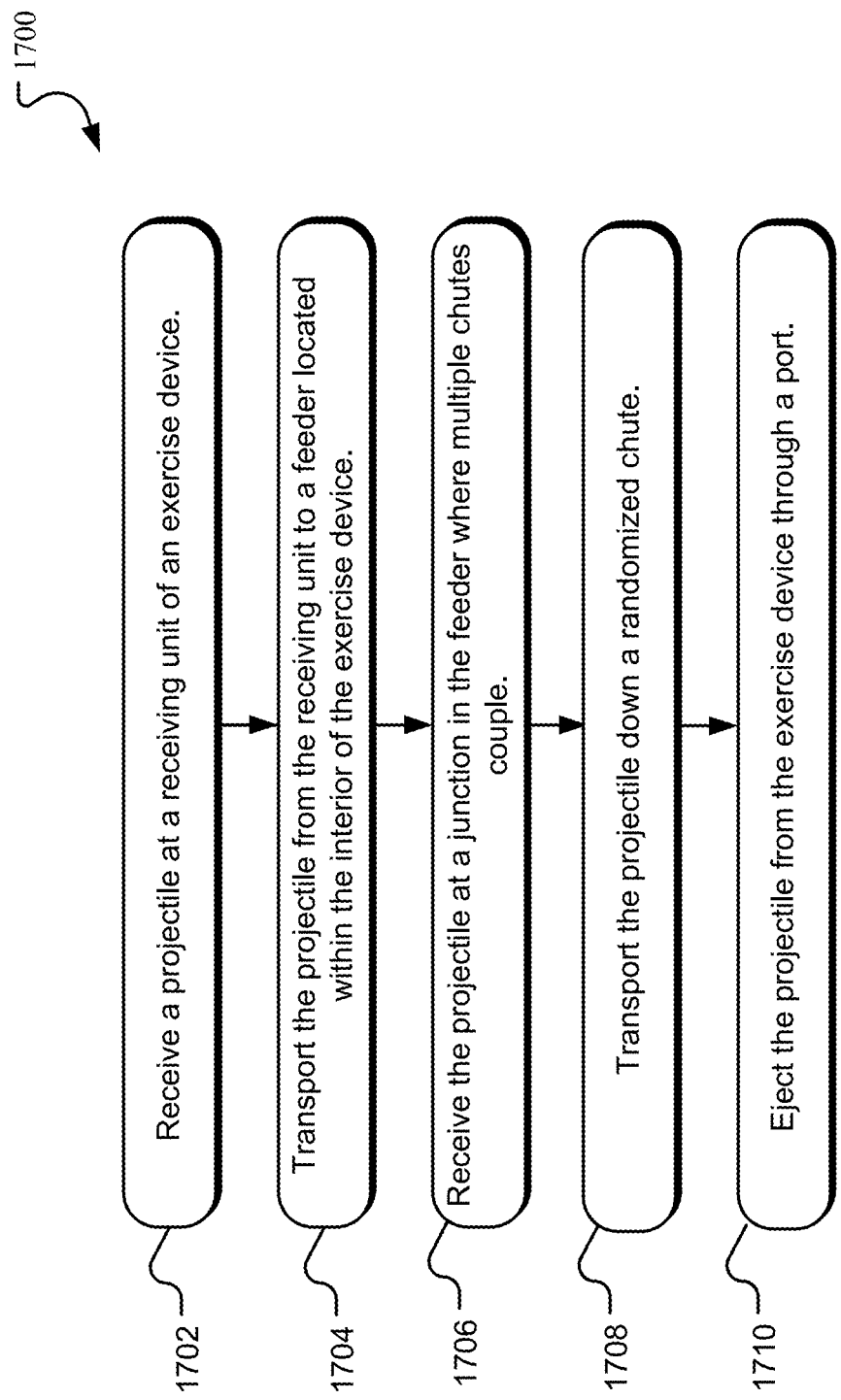
FIG. 17 illustrates example operations for providing interactive fetching with a randomized output.

FIG. 17 illustrates example operations 1700 for providing exercise and entertainment to one or more participants, such as pets. An operation 1702 receives a projectile at a receiver of an interactive fetching device from a participant. Operation 1704 then transports the projectile from the receiver of operation 1702 to a feeder located within the interior of the interactive fetching device. Operation 1706 receives the projectile at a junction in the feeder where multiple chutes couple. Operation 1708 transports the projectile down one of the multiple chutes of operation 1706 in a randomized output. Operation 1710 ejects the projectile from the device through a port for the participant to retrieve.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular examples. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A device for interactive fetching of a projectile by a participant, the device comprising:

a receiver having a receiver surface extending from a receiver edge to an opening, the receiver surface having a first surface opposing a second surface, the first surface configured to receive the projectile from the participant and direct the projectile through the opening;

a shell having a shell surface extending between a top portion and a bottom portion creating a shell interior, the receiver connected to the shell at the top portion, the second surface completely disposed within the shell interior, the opening in the receiver directing the projectile into the shell interior;

a base removably engaged to the shell at the bottom portion, the base having a base surface and a bottom support surface;

a projectile randomizer disposed completely within an interior formed by the shell interior and the base, the projectile randomizer including a lip coupled to the second surface of the receiver between the receiver edge and the opening, the opening in the receiver configured to receive the projectile into the projectile randomizer, the lip including one or more attachment features configured to couple to corresponding attachment features of the second surface of the receiver, the projectile randomizer including a plurality of chutes extending from a feeder; and a plurality of ports defined in the base surface, the plurality of ports positioned relative to a corresponding chute of the plurality of chutes and oriented at an angle relative to the bottom support surface, the plurality of ports facing different directions, one port in the plurality of ports configured to receive the projectile from the projectile randomizer and eject the projectile away from the device under gravitational force.

2. The device of claim 1, wherein a holding area formed into the bottom support surface includes a holding clip and a holding junction, the holding clip and the holding junction together configured to hold the projectile.

3. The device of claim 2, wherein the holding area further includes an indent positioned behind the holding clip and configured to receive the holding clip when the holding clip is pinched in connection with removing the projectile from the holding area.

4. The device of claim 1, wherein the plurality of chutes is disposed relative to a junction, the junction directing the projectile from the opening of the receiver into one chute of the plurality of chutes.

5. The device of claim 4, wherein the junction directs the projectile into the one chute of the plurality of chutes using gravity.

6. The device of claim 1, wherein one chute of the plurality of chutes randomly receives the projectile from the opening of the receiver.

7. The device of claim 1, wherein the plurality of ports are defined in the base surface at equidistant locations from each other.

8. The device of claim 1, wherein the projectile is directed to a randomized ejection path by the projectile randomizer randomly directing the projectile from the opening in the receiver to the one port of the plurality of ports.

9. The device of claim 1, wherein the feeder includes a plurality of chute openings defined in a feeder surface, each of the plurality of chutes further positioned relative to a corresponding chute opening of the plurality of chute openings.

10. The device of claim 9, wherein the feeder includes a chute input defined in the feeder surface relative to each of the plurality of chute openings, the chute input providing a smooth transport into the plurality of chute openings.

11. The device of claim 1, wherein the plurality of chutes each has a vertical orientation transitioning into an angled orientation, the vertical orientation at an intake end of each of the plurality of chutes and the angled orientation at an exit end of each of the plurality of chutes.

12. The device of claim 1, wherein each of the plurality of chutes includes a ramp.

13. The device of claim 12, wherein each of the plurality of chutes includes a first guard disposed opposite a second guard, the ramp disposed between the first guard and the second guard.

14. The device of claim 1, wherein the bottom portion of the shell has a first circumference and the top portion of the shell has a second circumference, the first circumference being larger than the second circumference.

15. The device of claim 1, wherein the base includes at least one clip removably securing the projectile in the base for storage.

16. The device of claim 1, wherein the angle is an acute angle formed with the bottom support surface.

17. A device for interactive fetching of a projectile by a participant, the device comprising:
    a receiver having a receiver surface extending from a receiver edge to an opening, the receiver surface having first and second opposing surfaces, the first surface configured to receive the projectile from the participant and direct the projectile through the opening;
    a shell having a shell surface extending between a top portion and a bottom portion to create a shell interior, the second surface completely disposed within an interior of the shell, the receiver connected to the shell at the top portion, the opening in the receiver directing the projectile into the shell interior;
    a base engaged to the shell at the bottom portion, the base having a base surface and a bottom support;
    a projectile randomizer disposed completely within an interior formed by the shell interior and the base and, the projectile randomizer including a lip coupled to the second surface of the receiver between the receiver edge and the opening, the opening in the receiver configured to receive the projectile into the projectile randomizer, the lip including one or more attachment features configured to couple to corresponding attachment features of the second surface of the receiver, the projectile randomizer including a plurality of chutes extending from a feeder; and
    a plurality of ports defined in the base surface adjacent to the bottom support surface, the plurality of ports positioned relative to a corresponding chute of the plurality of chutes and each forming a non-perpendicular angle with the bottom support surface, one of the plurality ports randomly configured to receive the projectile from the projectile randomizer and eject the projectile away from the device under gravitational force.

* * * * *